(12) United States Patent
Liao

(10) Patent No.: US 8,941,663 B2
(45) Date of Patent: Jan. 27, 2015

(54) METHOD AND DEVICE FOR RENDERING USER INTERFACE FONT

(75) Inventor: Hailiang Liao, Shenzhen (CN)

(73) Assignee: ZTE Corporation (CN)

( * ) Notice: Subject to any disclaimer, the term of this patent is extended or adjusted under 35 U.S.C. 154(b) by 339 days.

(21) Appl. No.: 13/521,088

(22) PCT Filed: Jul. 20, 2010

(86) PCT No.: PCT/CN2010/075322
§ 371 (c)(1),
(2), (4) Date: Jul. 9, 2012

(87) PCT Pub. No.: WO2011/130963
PCT Pub. Date: Oct. 27, 2011

(65) Prior Publication Data
US 2013/0021361 A1 Jan. 24, 2013

(30) Foreign Application Priority Data
Apr. 21, 2010 (CN) .......................... 2010 1 0152009

(51) Int. Cl.
| | |
|---|---|
| *G06T 11/00* | (2006.01) |
| *G06T 17/00* | (2006.01) |
| *G06F 17/21* | (2006.01) |
| *G06F 17/22* | (2006.01) |

(52) U.S. Cl.
CPC ............ *G06F 17/214* (2013.01); *G06F 17/211* (2013.01); *G06F 17/2217* (2013.01)
USPC ........................................ 345/467; 715/269

(58) Field of Classification Search
None
See application file for complete search history.

(56) References Cited

U.S. PATENT DOCUMENTS

| | | | |
|---|---|---|---|
| 6,751,726 B1 | 6/2004 | Dresevic et al. | |
| 6,922,812 B2* | 7/2005 | Broussard et al. | 715/236 |
| 8,044,960 B2 | 10/2011 | Sakurai et al. | |
| 2006/0103654 A1* | 5/2006 | Chik et al. | 345/467 |
| 2006/0170684 A1 | 8/2006 | Kobayashi et al. | |
| 2009/0122067 A1* | 5/2009 | Beck et al. | 345/467 |
| 2011/0043528 A1* | 2/2011 | Solomonov et al. | 345/467 |

FOREIGN PATENT DOCUMENTS

| | | |
|---|---|---|
| CN | 1811751 A | 8/2006 |
| CN | 101562005 A | 10/2009 |
| JP | 2007121874 A | 5/2007 |

OTHER PUBLICATIONS

PCT International Search Report Dated Feb. 10, 2011, Application No. PCT/CN2010/075322, Applicant ZTE Corporation et al.

* cited by examiner

*Primary Examiner* — Ryan R Yang
(74) *Attorney, Agent, or Firm* — Brooks Kushman P.C.

(57) ABSTRACT

The present invention discloses a method and an apparatus for rendering fonts of a user interface, both of which can establish a font cache table to cache fonts needed to be rendered, searches a font needed to be rendered in the font cache table and returns that font, and renders the founded font needed to be rendered. The method and the apparatus of the present invention pre-cache the fonts needed to be rendered by establishing the font cache table, so that the font rendering efficiency of the user interface can be improved significantly, especially the fluency of a dynamic user interface which contains plenty of font rendering is not reduced following the plenty of font rendering. In addition, the present invention further proposes a font supplementary scheme and a maintenance scheme of the font cache table, so as to make the present invention have more practical value.

14 Claims, 3 Drawing Sheets

METHOD AND DEVICE FOR RENDERING USER INTERFACE FONT

CROSS-REFERENCE TO RELATED APPLICATIONS

This application is a U.S. national phase of PCT Application No. PCT/CN2010/075322 filed Jul. 20, 2010 which claims priority to Chinese Application No. 201010152009.6 filed Apr. 21, 2010, the disclosures of which are incorporated in their entirety by reference herein.

TECHNICAL FIELD

The present invention relates to a technical field of a mobile phone user interface (UI), and in particular, to a method and apparatus for rendering fonts of a user interface.

BACKGROUND OF THE RELATED ART

The mobile phone user interface is also known as a Man-Machine Interface (MMI), which is responsible for interaction with users, and calling functions of other modules when necessary. A UI design refers to an overall design for the Man-Machine interaction, operating logic and beautiful interface of software. A good UI design not only makes a mobile phone become character and taste, but also makes operations of the mobile phone become comfortable, simple and free, thus fully embodying a position and a characteristic of the mobile phone.

The core of mobile phone UI development is a render engine for a mobile phone graphic interface. The render engine for the mobile graphic interface is different from a general render engine for a 2D or 3D graphic, it is required not only to be able to render more elegant graphic interface, but also that the rendering efficiency can be more higher and the occupancy of system resources is as low as possible.

A render engine for fonts of the mobile phone is a part of the render engine for mobile graphic interface, and is responsible for drawing all the fonts. In the render engine for mobile graphic interface, the speed for rendering the fonts of the mobile phone is often the slowest, and the efficiency is usually the lowest, so that the fluency of an interface requiring plenty of font rendering is very poor.

SUMMARY OF THE INVENTION

The technical problem to be solved by the present invention is to provide a method and an apparatus for rendering fonts of a user interface with higher efficiency.

In order to address the aforementioned technical problem, a technical scheme of the present invention is implemented as follows.

A method for rendering fonts of a user interface comprises:
establishing a font cache table to cache fonts needed to be rendered;
searching a font needed to be rendered in the font cache table and returning that font needed to be rendered; and
rendering the founded font needed to be rendered.

The font cache table is a hash linked list, and each node of the hash linked list comprises text information and a cache bitmap;
wherein, the text information is adapted for judging whether the font needed to be rendered is the same as a font cached in the font cache table; and the cache bitmap is adapted for rendering the font.

The method further comprises: caching a font which is not found in the font cache table into the font cache table.

The establishing the font cache table to cache the fonts needed to be rendered comprises:
generating a block of memory associated with a font needed to be cached;
setting properties of the memory, which includes setting a background color to be black, and setting a font color and a font format; and
calling a font drawing interface of a mobile phone platform to draw the font to the memory.

The method further comprises: if the searching the font needed to be rendered is failed, caching the font needed to be rendered into the font cache table, and at the same time returning the font needed to be rendered.

An apparatus for rendering fonts of a user interface comprises: a font cache module, a font searching module and a font rendering module; wherein,
the font cache module, is configured to store a font cache table which is adapted for caching fonts needed to be rendered;
the font searching module, is configured to search a font needed to be rendered in the font cache table, and to return the font needed to be rendered;
the font rendering module, is configured to render the font needed to be rendered.

The font cache table is a hash linked list, and each node of the hash linked list comprises text information and a cache bitmap;
wherein, the text information is adapted for judging whether the font needed to be rendered is the same as a font cached in the font cache table; and the cache bitmap is adapted for rendering the font.

The font cache module is further configured to cache a font which is not found in the font cache table into the font cache table.

When caching the fonts, the font cache module is specifically configured to:
generate a block of memory associated with a font needed to be cached;
set properties of the memory, which includes setting a background color to be black, and setting a font color and a font format; and
call a font drawing interface of a mobile phone platform to draw the font to the memory.

The device further comprises a font cache table maintenance module, which is configured to perform maintenance to the font cache table.

The beneficial effects of the present invention is that:
the present invention pre-caches the fonts needed to be rendered by establishing the font cache table, so that the font rendering efficiency of the user interface can be improved significantly, in particularly, the fluency of a dynamic UI (such as sliding of the user interface, dragging of an icon) which contains plenty of font rendering is not reduced following the plenty of font rendering. In addition, the present invention further proposes a font supplementary scheme and a maintenance scheme of the font cache table, so as to make the present invention have more practical value.

PREFERRED EMBODIMENTS OF THE PRESENT INVENTION

The present invention will be further illustrated in detail in combination with accompanying drawings and embodiments hereinafter.

In order to make the purpose, technical scheme and advantages of the present invention more clear and obvious, the present invention will be further illustrated in detail in combination with accompanying drawings and embodiments hereinafter. It should be understood that, the specific implementation described herein takes an AMC engine (Adobe Mobile Client) as a graphic engine and is implemented in an Arena platform (that is a mobile phone development platform), which is used to explain the present invention rather than restrict the present invention. The AMC engine is a mobile phone graphic engine of Adobe Company.

Figure 1:
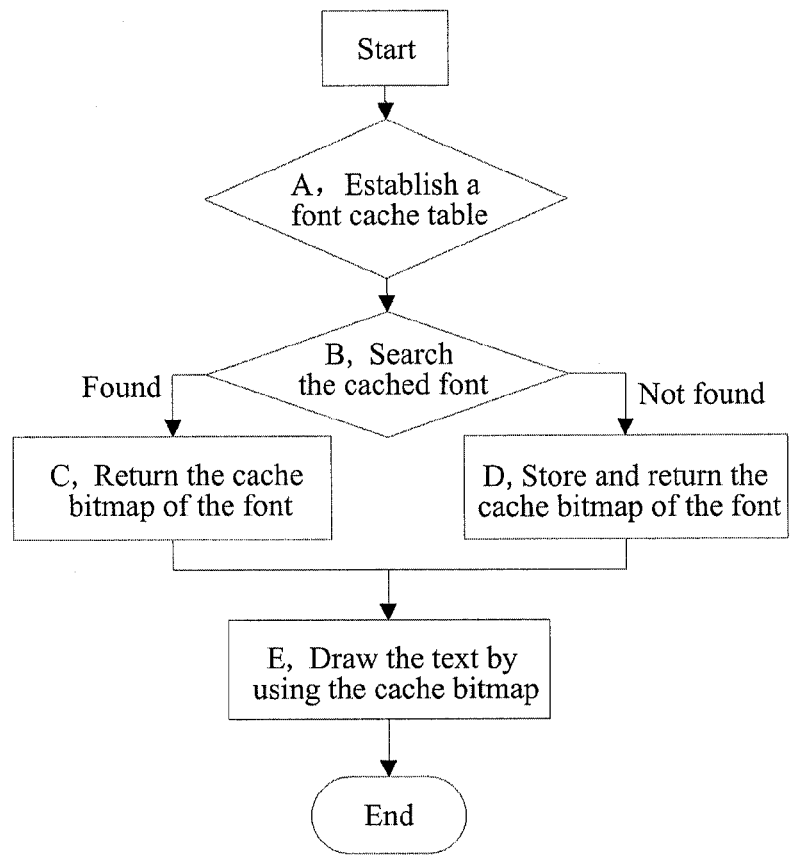
FIG. 1 is a flow chart of a method of a specific embodiment of the present invention.

FIG. 1 is a flow chart of a method of a specific embodiment of the present invention, and as shown in FIG. 1, the method for rendering fonts of a user interface of the present invention specifically comprises the following steps:

A, a font cache table is established, and fonts needed to be rendered, i.e., the shapes of the texts, are stored into the font cache table.

B, the font needed to be rendered is searched in the font cache table, if the font is found, step C is entered; if the font is not found, step D is entered.

C, the font needed to be rendered is returned, that is, the corresponding cache bitmap in the font cache table is returned, and then step E is entered.

D, a font drawing interface of a mobile phone platform is called to store the font needed to be rendered, which is not found in the font cache table, into a cache bitmap of the corresponding position in the font cache table, and that cache bitmap is returned, and then step E is entered.

E, the text is drawn by using the cache bitmap, that is, the font needed to be rendered is rendered.

During the specific implementation, if the font needed to be rendered is not found in the font cache table, the method of the present invention also calls the font drawing interface of the mobile platform to draw the font needed to be rendered, and then renders the font, and at the same time the font is cached into the font cache table.

The process of caching the font of the step D comprises the following steps:

D1, a block of memory associated with the font is generated, that is to say, a frame buffer area of that memory is made to be the same one memory as a data area of the font;

D2, various properties of the memory are set, which includes setting a background color to be black and setting a font color and a font format;

D3, a font drawing interface of a mobile phone platform is called to draw the text to the aforementioned memory, that is, the font of the text is stored into the aforementioned memory, to implement drawing the font with the cache bitmap.

In step E, the process of font rendering is a process of copying the cache bitmap, and the following operations are performed on the each pixel of the cache bitmap of the font.

In step E1, if the RGB value of the pixel is zero, it is returned; otherwise, step 402 is entered.

In step E2, a pixel p corresponding to the pixel in a screen frame buffer area is calculated, and the RGB value of the pixel is copied to the pixel p.

Figure 2:
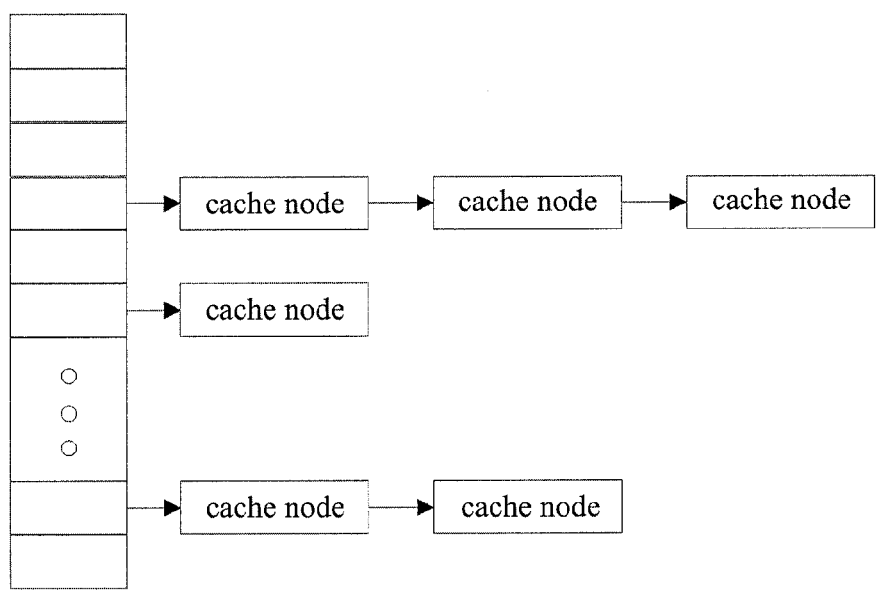
FIG. 2 is a schematic diagram of a font cache table.

The font cache table CASHER_TABLE is a data structure for caching the rendered font, and is a hash linked list. The font cache table CASHER_TABLE is composed of an index array and cache nodes TextCashers. As shown in FIG. 2, each cache node TextCasher includes two parts: text information and a cache bitmap. The text information stores a text code, a font name, a font size, a font color and a range of output rectangle, and is a basis for judging whether the font needed to be rendered currently is the same as a font in the font cache table. The cache bitmap stores the font of the text, and is adapted for rendering the font.

The cache node TextCasher is defined as follows:

```
typedef struct _TextCasher
{
    AMTextInfo textInfo;
    BITMAP    mbp;
    struct _TextCasher*next;
}TextCasher;
```

Figure 3:
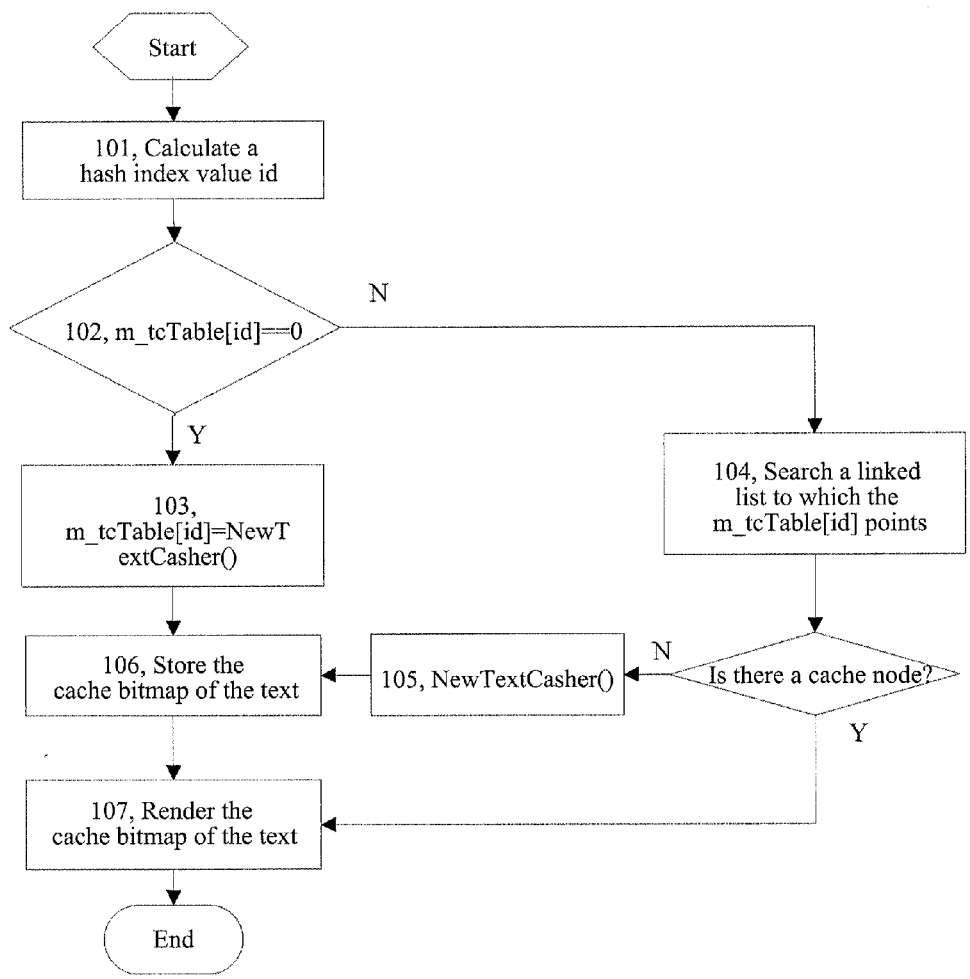
FIG. 3 is a flow chart for searching cached fonts in a method of the present invention.

The font cache table CASHER_TABLE is defined as follows:
define HASH_TABLE_LENGTH 1000
TextCasher*m_tcTable[HASH_TABLE_LENGTH];

FIG. 3 is a flow chart of searching a cached font, and the specific steps are as follows.

In step 101, a hash index value id is calculated by using a function of ComputeHashID( ) and by using the text code, the font name, the font size and the font color.

In step 102, if m_tcTable[id] equals to zero, it indicates that there is no cache node TextCasher at the hash index value id, step 103 is entered, otherwise, step 104 is entered.

In step 103, a cache node TextCasher is added at m_tcTable [id], and then step 106 is entered.

In step 104, the linked list to which the m_tcTable[id] points is searched, if there is the cache node of the font needed to be rendered, a pointer of that cache node is returned, and then step 107 is entered; otherwise, a pointer of the last cache node in the linked list is returned, and then step 105 is entered.

In step 105, a cache node TextCasher is added behind the pointed cache node, and step 106 is entered.

In step 106, the font needed to be rendered is stored into the pointed cache node TextCasher, and a pointer of that node is returned, and step 107 is entered.

In step 107, the cache bitmap in the corresponding cache node TextCasher is rendered.

In order to improve the searching efficiency, and not make the font cache table occupy too much memory, the font cache table is needed to be maintained, and the specific method is as follows.

Variables are defined: access_num, which represents the number of times for searching; and avg_step, which represents the average number of times for searching.

In step 201, the font cache table is searched, if the cached font is found, the number of times for searching needed by finding the font is saved into a variable temp_step, and the value of the access_num is added by 1.

In step 202, the average number avg_step of times for searching is calculated according to the following manner:

avg_step(avg_step*(access_num−1)+temp_step)/access_num.

In step 203, if avg_step is larger than a threshold s, the font cache table is emptied, and at the same time access_num and avg_step are reset to zero.

The average number of times for searching can be kept smaller than the threshold s by the aforementioned method.

The threshold s is a preset threshold of the average number of times for searching, and can be set according to the actual condition, e.g., the present embodiment sets it as s=3.

Figure 4:
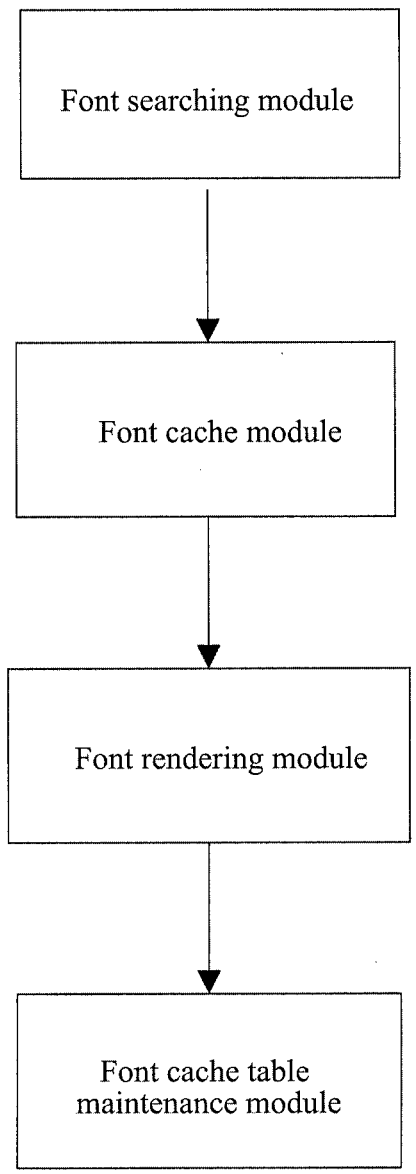
FIG. 4 is a structure diagram of an apparatus of a specific embodiment of the present invention.

FIG. 4 is a structure diagram of an apparatus of a specific embodiment of the present invention. As shown in FIG. 4, the apparatus for rendering fonts of a user interface of the present invention comprises a font searching module, a font cache module, a font rendering module and a font cache table maintenance module.

Wherein, the font cache module stores a font cache table, and the font cache table is adapted for caching the fonts needed to be rendered. The font cache table CASHER_TABLE is a data structure for caching the rendered font and is a hash linked list; the font cache table CASHER_TABLE is composed of an index array and cache nodes TextCashers, and each cache node TextCasher includes two parts: text information and a cache bitmap. The text information stores a text code, a font name, a font size, a font color and a range of output rectangle, and is a basis for judging whether the font needed to be rendered is the same as a font cached in the font cache table. The cache bitmap stores the font of the text and is adapted for rendering the font.

The cached font searching module is adapted for searching the position of the fonts needed to be rendered in the font cache table CASHER_TABLE.

The font cache module is further configured to cache a font which is not found in the font cache table into the font cache table, to call a font drawing interface of a mobile phone platform to cache the font which is not found in the font cache table into the font cache table CASHER_TABLE. The specific implementation steps are the same as the description in the method, and will not be repeated herein.

In the embodiment, if the font searching module fails to find the font needed to be rendered, the font cache module caches the font needed to be rendered into the font cache table by the aforementioned scheme, and at the same time returns the font needed to be rendered to provide to the font rendering module to execute.

In the embodiment, the background color of the memory is set as black, and the RGB (RGB represents three components of color of the computer graphics, namely red, green, blue) values of black are all zero, while the font color is not black, therefore, the RGB values of the pixel where the font is located are not zero in the cache bitmap, and the RGB values of pixels of other part are all zero. Thus the action of the cache bitmap is a mask, and the pixel is judged whether to belong to the part of the font or to belong to the other background part by judging whether the RGB values of each pixel are zero or not. Therefore the cache bitmap having a mask function is considered as a mask bitmap of text in the present invention. The mask bitmap refers to that the stored bitmap is the cache bitmap of the text shape in the present invention.

The main function of the font rendering module is to utilize the cache bitmap of the corresponding font in the font cache table to render the font efficiently.

The font cache table maintenance module is configured to maintain the font cache table, so as to improve the searching efficiency and not make the font cache table occupy too much memory. The specific scheme for maintaining the font cache table is the same as the description of the method, and is not repeated herein.

The purpose, technical scheme and beneficial effects of the present invention are further illustrated in detail with the specific embodiments described above. It should be noted that, the above description is only the specific embodiments of the present invention, and those skilled in the art can make various modifications and variations to the present invention without departing from the spirit and scope of the present invention. Thus, if these modifications and variations of the present invention belong to the scope of the technical scheme and its equivalent technology recorded in the present invention, the present invention is also intended to comprise these modifications and variations.

What is claimed is:

1. A method for rendering fonts of a user interface, comprising:
    establishing a font cache table to cache fonts needed to be rendered;
    searching a font needed to be rendered in the font cache table and returning that font needed to be rendered; and
    rendering the founded font needed to be rendered;
    wherein the font cache table is a hash linked list, and each node of the hash linked list comprises text information and a cache bitmap;
    wherein, the text information is adapted for judging whether the font needed to be rendered is the same as a font cached in the font cache table; and the cache bitmap is adapted for rendering the font.

2. The method according to claim 1, further comprising: caching a font which is not found in the font cache table into the font cache table.

3. The method according to claim 2, wherein, the establishing the font cache table to cache the fonts needed to be rendered comprises:
    generating a block of memory associated with a font needed to be cached;
    setting properties of the memory, which includes setting a background color to be black, and setting a font color and a font format; and
    calling a font drawing interface of a mobile phone platform to draw the font to the memory.

4. The method according to claim 2, further comprising: if the searching the font needed to be rendered is failed, caching the font needed to be rendered into the font cache table, and at the same time returning the font needed to be rendered.

5. The method according to claim 1, further comprising: caching a font which is not found in the font cache table into the font cache table.

6. The method according to claim 5, wherein, the establishing the font cache table to cache the fonts needed to be rendered comprises:
    generating a block of memory associated with a font needed to be cached;
    setting properties of the memory, which includes setting a background color to be black, and setting a font color and a font format; and
    calling a font drawing interface of a mobile phone platform to draw the font to the memory.

7. The method according to claim 5, further comprising: if the searching the font needed to be rendered is failed, caching the font needed to be rendered into the font cache table, and at the same time returning the font needed to be rendered.

8. An apparatus for rendering fonts of a user interface, comprising: a font cache module, a font searching module and a font rendering module; wherein,
    the font cache module, is configured to store a font cache table which is adapted for caching fonts needed to be rendered;
    the font searching module, is configured to search a font needed to be rendered in the font cache table, and to return the font needed to be rendered;
    the font rendering module, is configured to render the font needed to be rendered;

the font cache table is a hash linked list, and each node of the hash linked list comprises text information and a cache bitmap;

wherein, the text information is adapted for judging whether the font needed to be rendered is the same as a font cached in the font cache table; and the cache bitmap is adapted for rendering the font.

9. The apparatus according to claim 8, wherein:

the font cache module is further configured to cache a font which is not found in the font cache table into the font cache table.

10. The apparatus according to claim 9, wherein, when caching the fonts, the font cache module is specifically configured to:

generate a block of memory associated with a font needed to be cached;

set properties of the memory, which includes setting a background color to be black, and setting a font color and a font format; and call a font drawing interface of a mobile phone platform to draw the font to the memory.

11. The apparatus according to claim 8, further comprising: a font cache table maintenance module, which is configured to perform maintenance to the font cache table.

12. The apparatus according to claim 8, wherein:

the font cache module is further configured to cache a font which is not found in the font cache table into the font cache table.

13. The apparatus according to claim 12, wherein, when caching the fonts, the font cache module is specifically configured to:

generate a block of memory associated with a font needed to be cached;

set properties of the memory, which includes setting a background color to be black, and setting a font color and a font format; and call a font drawing interface of a mobile phone platform to draw the font to the memory.

14. The apparatus according to claim 8, further comprising: a font cache table maintenance module, which is configured to perform maintenance to the font cache table.

* * * * *